United States Patent
Collins et al.

(10) Patent No.: US 11,922,265 B2
(45) Date of Patent: Mar. 5, 2024

(54) SYSTEM AND METHOD FOR AUTHENTICATING AN ARTICLE

(71) Applicant: INTELLIGENT MATERIAL SOLUTIONS, INC., Princeton, NJ (US)

(72) Inventors: Joahua E. Collins, Wallingford, PA (US); Howard Y. Bell, Princeton, NJ (US)

(73) Assignee: INTELLIGENT MATERIAL SOLUTIONS, INC., Princeton, NJ (US)

( * ) Notice: Subject to any disclaimer, the term of this patent is extended or adjusted under 35 U.S.C. 154(b) by 88 days.

(21) Appl. No.: 17/620,858

(22) PCT Filed: Jun. 18, 2020

(86) PCT No.: PCT/US2020/038327
§ 371 (c)(1),
(2) Date: Dec. 20, 2021

(87) PCT Pub. No.: WO2020/257386
PCT Pub. Date: Dec. 24, 2020

(65) Prior Publication Data
US 2022/0343090 A1 Oct. 27, 2022

Related U.S. Application Data

(60) Provisional application No. 62/864,050, filed on Jun. 20, 2019.

(51) Int. Cl.
*G06K 7/12* (2006.01)

(52) U.S. Cl.
CPC .................................... *G06K 7/12* (2013.01)

(58) Field of Classification Search
None
See application file for complete search history.

(56) References Cited

U.S. PATENT DOCUMENTS

| 4,783,823 A | 11/1988 | Tasaki et al. |
| 6,786,954 B1 | 9/2004 | Lee et al. |

(Continued)

OTHER PUBLICATIONS

International Search Report and Written Opinion for corresponding PCT Application No. PCT/US2020/038327, dated Sep. 11, 2020.

*Primary Examiner* — Kristy A Haupt
(74) *Attorney, Agent, or Firm* — MEAGHER EMANUEL LAKS GOLDBERG & LIAO, LLP

(57) ABSTRACT

This disclosure relates to a card having (i) an infrared-blocking material capable of blocking a plurality of near infrared wavelengths and (ii) at least one phosphor particle capable of absorbing at least one near-infrared wavelength, and a card reader capable of allowing a user to interrogate the card and determine if it is authentic, and to read information from the card. The card reader typically includes a processor configured to cause the card reader to emit at least one wavelength of light, receive at least one additional wavelength of light emitting by the at least one phosphor particle, and identify at least one characteristic of the at least one phosphor particle selected from the group consisting of a location on the card, a rise time of the phosphor, and a decay time of the phosphor.

16 Claims, 3 Drawing Sheets

(56) References Cited

U.S. PATENT DOCUMENTS

| | | | |
|---|---|---|---|
| 2007/0119951 A1* | 5/2007 | Auslander | G06K 19/06075 235/491 |
| 2012/0006902 A1* | 1/2012 | Faenza, Jr. | B41M 3/14 235/487 |
| 2014/0021369 A1* | 1/2014 | Rapoport | B42D 25/29 283/92 |
| 2019/0111255 A1* | 4/2019 | Errico | A61N 2/02 |

* cited by examiner

SYSTEM AND METHOD FOR AUTHENTICATING AN ARTICLE

CROSS-REFERENCE TO RELATED APPLICATIONS

The present application claims priority to U.S. Provisional Patent Application No. 62/864,050, filed on Jun. 20, 2019. The entire disclosures of that application are hereby incorporated herein by reference in their entireties.

TECHNICAL FIELD OF THE INVENTION

The invention relates generally to labels, identification cards, and transaction cards, and more particularly, to the use of optically recognizable cards that may contain a hologram, magnetic stripe, or integrated circuit as well as other transaction card constituents, which may be detected by currently available card printing machines, automatic teller machines, and other card readers.

BACKGROUND OF THE INVENTION

Authentication of various documentation has become a critical concern is recent years. Various cards used for identification or transactions may include the issuer's name, the cardholder's name, the card number, and the expiration date, and a signature field. However, in recent years, governments, banks, and corporations have all attempted to improve security of their documents by introducing additional security measures into various cards used for the purposes of identification or transactions. For example, passports and driver's licenses now routinely include special paper, special ink, and holographic images, and when checking a person's passport or driver's license, those additional security measures can be used to ensure that the document is authentic. Plastic smart cards, such as credit cards have moved from simply requiring a pin to having chips embedded on the cards to improve security.

Many of the card acceptance devices require that the card be inserted into the device such that the device can appropriately align its reading head with the relevant component of the transaction card. For example, many ATMs require that a transaction card be substantially inserted into a slot in the ATM. After insertion of the card into the slot, the ATM may have an additional mechanical device for further retracting the transaction card into the ATM slot. To activate the ATM, the ATM typically includes a sensor, such as a phototransistor and a light emitting diode (LED), which emits light onto a card surface and the phototransistor receives light from the LED. A card blocks the infrared radiation from the phototransistor, therefore indicating that a card has been detected. A typical LED in an ATM is an IRED (infrared emitting diode) source having a wavelength in the range of about 820-920 nm or 900-1000 nm, which is not present in ambient light at the levels needed by a phototransistor sensor. The spectral sensitivity curve of the typical phototransistor is in the range of about 400-1100 nm. However, the visible spectrum is about 400-700 nm, and the spectral sensitivity of the phototransistor is about 60% at 950 nm and 90% at 840 nm. Thus, visible light is not part of the analog-to-digital algorithm. Moreover, ISO 7810, clause 8.10 requires that all machine-readable cards have an optical transmission density from 450-950 nm, greater than 1.3 (less than 5% transmission) and from 950-1000 nm, greater than 1.1 (less than 7.9% transmission).

For a card to be detected by, e.g., an ATM, the light is typically blocked by the card body. Moreover, the amount of light necessary to be blocked by a card is related to the voltage data received from the analog to digital conversion. The voltage range of the sensor is typically in a range of about 1.5 V to 4.5 V. When a card is inserted into a sensor, the voltage drops to less than 1.5 V indicating the presence of a card in the transport system. After the card is detected by the phototransistor, the system accesses the information on the chip and/or on the magnetic stripe.

However, the existing standards used to protect this information can readily be hacked, such that relying on a chip or magnetic stripe to provide the necessary authentication is unacceptable in today's world.

As such, a more secure method for authenticating cards is needed and desirable.

BRIEF SUMMARY OF THE INVENTION

A first disclosed aspect is a system for authentication, involving a card having an infrared-blocking material and at least one phosphor particle, and a card reader that includes a light emitting device, a near-infrared detector, and a processor, where the processor causes the card reader to emit a first wavelength of near infrared light to be received by the detector with a first signal strength, determine the presence of the card based on a comparison of the first signal strength and the signal strength of the received after a card has been inserted, and authenticates the card by causing the card reader to emit at least one second wavelength, receiving at least one third wavelength at the detector, each of the at least one third wavelengths being emitted by the at least one phosphor particle, and identifying at least one characteristic of the at least one phosphor particle selected from the group consisting of a location on the card, a rise time of the phosphor, and a decay time of the phosphor. Preferably, the location and the rise time or decay time are identified. More preferably, all three are identified. The system may also compare the identified characteristic to information stored on the card and/or in an external database. The processor may also send the identified characteristic to a remote server, where the remote server can make a determination of authenticity based on the identified characteristic and send the results of that determination to the card reader. In some instances, the determination may be made by comparing the identified characteristic to information stored in a private blockchain. If the phosphors on the card are arranged in a 1D, 2D, or 3D barcode, the system may also recognize and/or convert an identified characteristic to at least one code, such as a 1D, 2D, or 3D barcode.

In some instances, the at least one phosphor particle encodes at least 8 bits of data. The processor may also receive a visible light image of at least one side of the card, and/or may also detect characters present in the captured image of at least one side of the card. In some instances, the infrared-blocking material and the phosphor particle are located in one layer of the card, while in others, they are located in separate layers of the card. In some instances, the at least one second wavelength includes a plurality of wavelengths, and the at least one third wavelength includes an additional plurality of wavelengths.

A second disclosed aspect is a method for authenticating identification cards. The method includes emitting a first wavelength of near infrared light to be received by a detector with a first signal strength, determining the presence of a card based on a comparison of the first signal strength and a second signal strength detected by the detector after the card has been inserted, the card comprising an infrared-blocking material capable of blocking a plurality of near infrared wavelengths and a phosphor particle capable of absorbing at least one near-infrared wavelength, wherein a card is considered present if the second signal strength is less than that of the first signal strength, emitting at least one second wavelength of near infrared light to be at least partially absorbed by the phosphor particle, receiving at least one third wavelength of near-infrared light at the detector, each of the at least one third wavelengths being emitted by the phosphor particle, and detecting at least one phosphor particle characteristic selected from the group consisting of a location on the card, a rise time of the phosphor, and a decay time of the phosphor. The method may also include comparing the detected phosphor particle characteristic to information stored on the card and/or in an external database. The processor may also send the identified characteristic to a remote server, where the remote server can make a determination of authenticity based on the identified characteristic and send the results of that determination to the card reader. In some instances, the determination may be made by comparing the identified characteristic to information stored in a private blockchain. The system may also convert an identified characteristic to at least one code, such as a 1D, 2D, or 3D barcode. That is, the system could interpret the encoded 1D, 2D, or 3D barcode based on the identified characteristic(s). In some instances, the at least one phosphor particle encodes at least 8 bits of data. The processor may also receive a visible light image of at least one side of the card, and/or may also detect characters present in the captured image of at least one side of the card. In some instances, the infrared-blocking material and the phosphor particle are located in one layer of the card, while in others, they are located in separate layers of the card. In some instances, the at least one second wavelength includes a plurality of wavelengths, and the at least one third wavelength includes an additional plurality of wavelengths.

BRIEF DESCRIPTION OF THE DRAWINGS

The following figures, which are described below, and which are incorporated in and constitute a part of the specification, illustrate exemplary embodiments according to the invention and are not to be considered limiting of the scope of the invention, for the invention may admit to other equally effective embodiments. The figures are not necessarily to scale, and certain features and certain views of the figures may be shown exaggerated in scale or in schematic in the interest of clarity and conciseness.

DETAILED DESCRIPTION

As used herein, "card" means any physical form of identification or substrate capable of being used for conducting transactions, including credit cards, business cards, driver's licenses, passports, clothing tags.

In general, the present invention allows for the identification and detection of various articles, wherein the articles include materials having optically recognizable (i.e., infrared) inks and/or films. The articles include, for example, transaction cards, documents, papers and/or the like. The materials include, for example, coatings, films, threads, plastics, inks, fibers, paper, planchettes, and/or the like.

Figure 1:
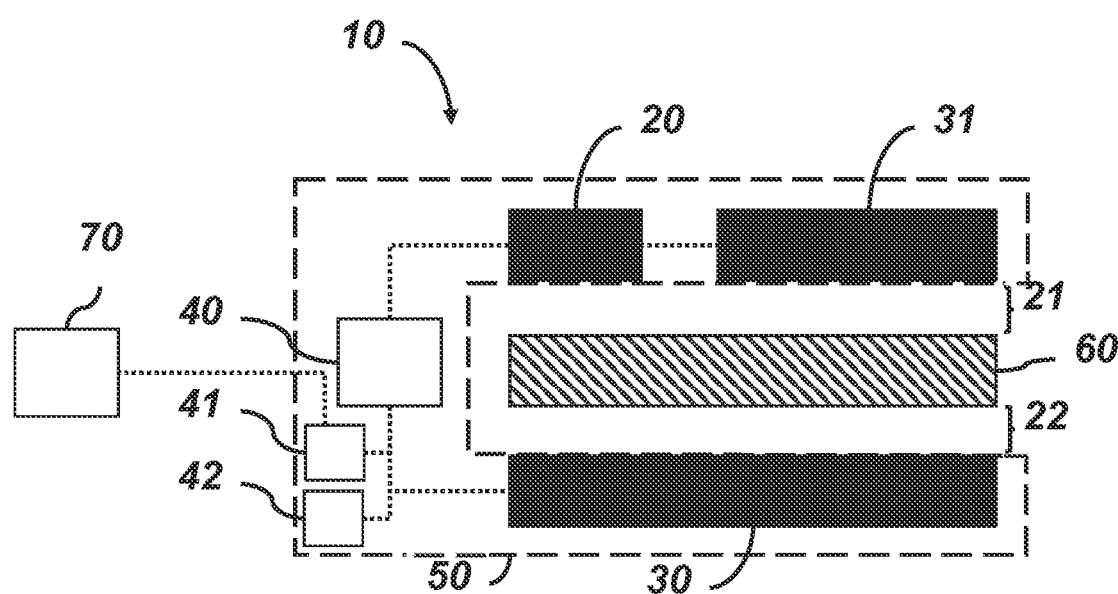
FIG. 1 shows a schematic of an embodiment of a disclosed system.

Referring to FIG. 1A, an embodiment of a disclosed system is shown. The system (10) generally includes a card reader having a light emitting device (20) and one or more detectors (30, 31), connected to at least one processor (40), all of which is typically present within a housing (50). The processor may optionally be connected to one or more communication interfaces (41), which may allow for wired and or wireless connections using a variety of protocols. The processor may also optionally be connected to one or more signaling elements (42), which may include a display screen, a green and/or red light, or other component for providing information to a user.

The system also includes a card (60). In some embodiments, the light emitting device (20) and any detectors (30, 31) are configured such that a card (60) can either interrupt light passing from the light emitting device (20) to one of the detectors (30), or cause light emitted from the light emitting device to reflect back towards one of the detectors (31).

The card (60) may be inserted or positioned so as to be at least partially illuminated by the light emitting device (20) and at least one detector (30, 31) can be used to read the card (60) and determine its authenticity. In some embodiments, there is a detector (30, 31) on both sides of the card. In some embodiments (not shown), the light emitting device (20) is configured to face a different surface of the card than all of the detectors (30). In some embodiments (not shown), the light emitting device (20) is configured to face the same surface of the card as all of the detectors (31). As examples, in some embodiments, the light emitting device is placed above where a card would be inserted or positioned, and all detectors are placed below where the card would be inserted; in other embodiments, the light emitting device and all detectors are placed above where the card would be inserted or positioned.

The distances (21,22) between a surface of the card and the light emitting device (20) or detector (30, 31), through which light is travelling through air, can vary, depending on the approach utilized. In some embodiments, the distance (21, 22) is less than 5 mm. In some embodiments, the distance is greater than 1 cm, such as between 1 cm and 100 cm, or 1 cm and 3 cm, or between 1 cm and 10 cm, or between 1 cm and 5 cm. In some embodiments, the distances (21, 22) are both less than 5 mm. In some embodiments, the distance (21) from the light emitting device to a surface of the card is greater than the distance (22) between the opposite surface of the card and a detector (30).

The light emitting device (20) can be any source adapted to emit near infrared (NIR) wavelengths, which as used herein includes wavelengths between 750 nm and 3,000 nm. Such sources may include: NIR lasers, NIR laser diodes, NIR LEDs, incandescent sources filtered for NIR, and supercontinuum lasers.

The one or more detectors (30, 31) can be any detector adapted to detect NIR output, and preferably able to detect specific wavelengths of NIR output. The detector can include, e.g., a phototransistor, photomultiplier tubes, silicon CCDs, etc. One or more of the detectors (30) may be configured to detect transmission through the card (60), while one or more of the detectors (31) may be configured to detect reflections off the card (60). The one or more detectors may also include an optical camera for capturing visible-light images of one or both sides of the card.

The card (60) will typically needs to be able to prevent at least some wavelengths of NIR light from reaching a detector, but also convert some wavelengths of NIR light from one wavelength to a higher (or lower) wavelength of NIR light in a way that the system can detect.

The card will typically include optically recognizable inks and films which may be invisible, visible, or colored to produce a desired effect and/or they may contain other detectable compounds, such as, for example, UV-Fluorescent or IR-Fluorescent and/or phosphorescent features. The optically recognizable inks and films preferably have good stability, resistance properties, durability, and other physical properties, such as good appearance, flexibility, hardness, solvent resistance, water resistance, corrosion resistance, and exterior stability. Moreover, the use of such inks and films typically does not interfere with UV compounds that may be present in many substrates. The optically recognizable ink comprises any dye, absorber, and/or the like, the combination of which is recognizable by a sensor.

The system may optionally include one or more remote computing devices (70), which may be a remote server, smartphone, laptop, etc.

Figure 2A:
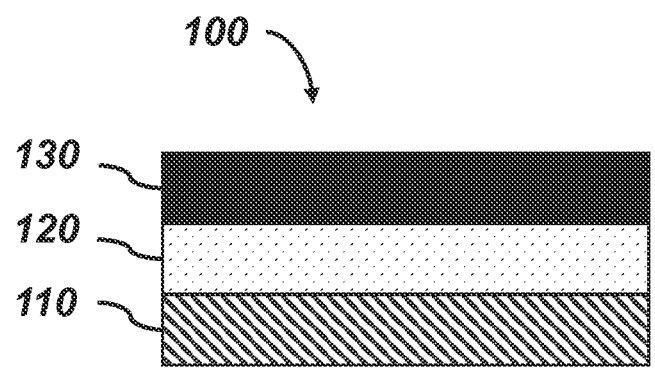
FIGS. 2A, 2B, and 2C show cross-sections of cards used in the disclosed system.
Figure 2B:
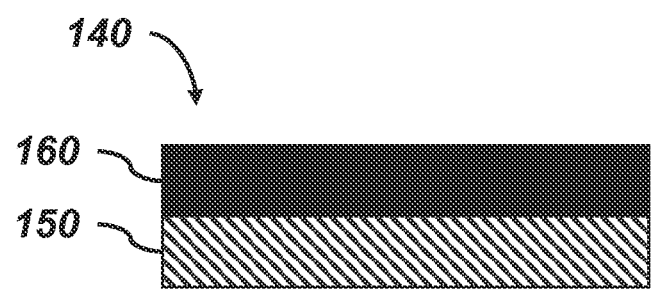
Figure 2C:
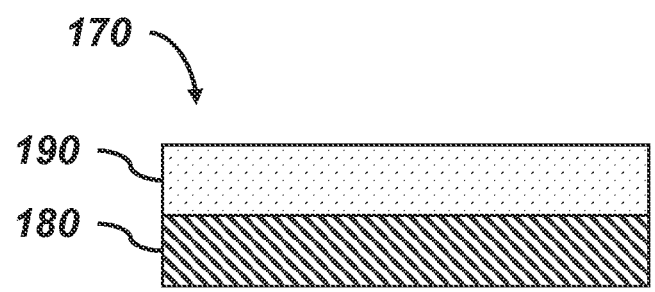

Exemplary approaches can be seen in reference to FIGS. 2A-2C. In FIG. 2A, the card (100) comprises a substrate layer (110), a layer containing one or more phosphor particles (120) and a layer containing an infrared-blocking material (130). In FIG. 2B, the card (140) comprises a substrate layer (150) which also contains one or more phosphor particles, and a top layer containing an infrared-blocking material (160). In FIG. 2C, the card (170) contains a substrate layer (180) which also contains or functions as an IR-blocking material, and a layer containing one or more phosphor particles (120) and a layer containing an infrared-blocking material (190).

The phosphor particles may be of any size, although preferably the particles have an average diameter less than 10 μm, preferably less than 1 μm, and more preferably less then 100 nm. For example, particle host compositions can be $NaYF_4$, $LiYF_4$, $BaYF_5$, $NaGdYF_4$ and either singly doped or dopant combinations of the following rare earth elements; Ytterbium (Yb), Erbium (Er), Thulium (Tm), Neodymium (Nd), Holmium (Ho), Dysprosium (Dy), Europium (Eu), and Praseodymium (Pr). For optimum effect the nanoparticles have to be large enough to provide sufficient light output for detection but at the appropriate concentration and small enough to have little to no visible scattering, providing a visibly transparent film. In one embodiment, 100 nm $NaYF_4$:$Yb_{0.2}Er_{0.02}$ are utilized at a working concentration of 1 mg/ml. Other compositions and particle sizes can include, but are not limited to, the following (average particle size in parentheses): LiYF4:Yb,Er (130 nm), LiYF4:Yb,Er (40 nm), NaYF4:Yb,Nd (20 nm), and NaYF4:Yb,Er (20 nm). Generally speaking, NaYF4 host matrices can provide particle sizes ranging from 10 nm-500 nm, LiYF4 hosts enable 40 nm-150 nm, BaYF5 host particle sizes range from 5-10 nm. Other compositions such as oxide and oxysulfide hosts can possess particle size ranges from 100 nm-10 um. In preferred embodiments, each type of phosphor present on the card is substantially uniform in size (i.e., all particles have a particle size ±10% of the average particle size). In preferred embodiments, multiple types of phosphors are present, such as 2 or more, 3 or more, 4 or more, 5 or more, 6 or more, 7 or more, or 8 or more. In preferred embodiments, the particles are utilized at working concentrations of less than 5 mg/ml, and preferably less than 2 mg/ml, and more preferably at 1 mg/ml or less.

The infrared-blocking material includes materials that absorb, refract, diffuse, reflect, and/or otherwise block or prevent the transmission of at least some NIR wavelengths through the material. Several classes of materials can be used to achieve a desired IR blocking capability either relying on direct absorption of IR light or diffuse reflectance and/or scattering of IR light through construction of birefringent films. One example of an IR scattering film is the Infrared Reflecting Film (IRF) or Automotive Window Film Crystalline Series films produced by 3M™, which are sometimes described as a Multilayer Optical Film (MOF) using co-extruded PVC film layers and all appear to reflect >92% of near infrared light. Other possible IR shielding layers can be utilized containing organic transition and rare earth metal complexes providing either reflective or absorption capabilities. Examples of inorganic compounds where IR-absorption is a consequence of electronic transitions of a particular element include compounds that possess one or more cations and one or more anions from the following groups, Cations: Yb, Ti, V, Cr, Mn, Fe, Co, Ni and Cu, and Anions: PO4, P2O7, HPO4, TiO3, VO4, WO4, F−, oxides and hydroxides (OH−). In some embodiments, the infrared-blocking material is a film having a thickness of between 1 mil (0.001 inches) and 5 mil (0.005 inches).

Figure 3:
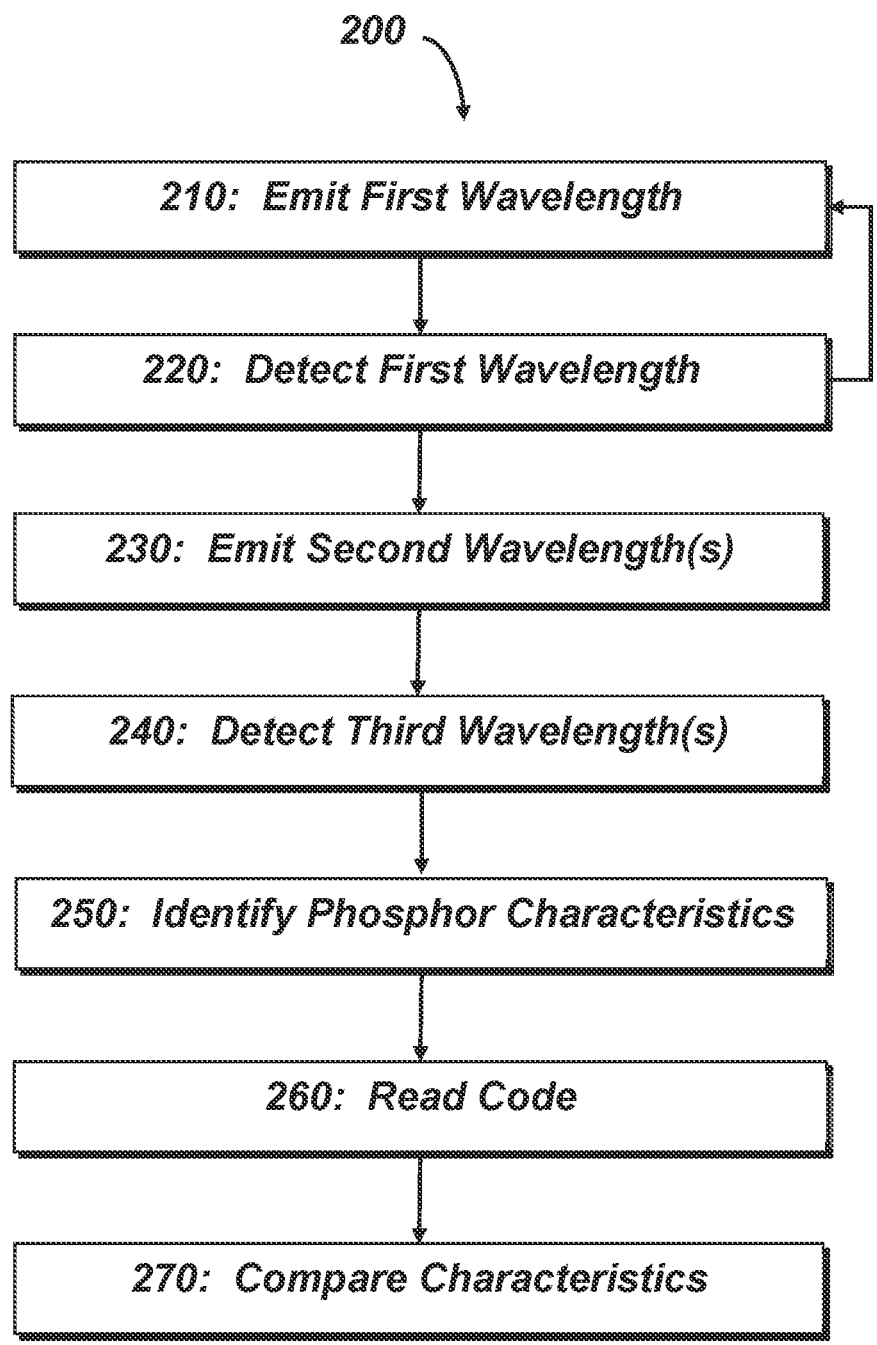
FIG. 3 is a flowchart representing an embodiment of a disclosed method.

The system's one or more processors (40) must be configured to control the system and indicate to a user whether the card is authentic or not. FIG. 3 provides a flowchart for one embodiment of such a configuration. The system will typically contain non-volatile memory with an instruction set that, when executed, causes the processor to control the card reader in a particular manner. As seen in FIG. 3, the processor's instructions (200) may cause the system to emit a first wavelength (210) of near infrared light, which is then received by the detector, which detects the first wavelength (220). This process will typically continue until a card is inserted between the light emitting device and the detector, causing the signal strength to decrease. By comparing a first signal strength (without a card present) and the signal strength that is periodically or continually being received by the detector, the processor can determine if a card is present. Typically, the signal strength with decrease by at least 50%, at least 60%, at least 70%, at least 80%, at least 90%, or at least 95% as compared to the original signal strength. If no card is detected, it continues the cycle of emitting/detecting (210/220).

In some embodiments that do not rely on a card being placed between the light emitting device (20) and a detector (30), one of the detectors (31) may detect and increase in the received light, indicating light is reflecting off a card and therefore a card is present.

Once it is determined a card is present, the system emits one or more second wavelengths (230). Preferably, these wavelengths include at least one wavelength the phosphor particle will absorb as well as at least one wavelength the phosphor particle will not absorb. In some embodiments, three or more second wavelengths are utilized. In some embodiments, five or more second wavelengths are utilized.

The system may optionally capture optical/visible-light images of the card, either before, after, or during the time in which the second wavelengths are emitted.

Detector(s) in the system can then detect (240) any wavelengths emitted by the phosphor particles. In some embodiments, the emitting (210) and detecting (220) of a first wavelength are not utilized. In one embodiment, the system waits until a button is pressed to attempt to authenticate a card, and in a second embodiment, the system simply emits second wavelength(s) (230) until the system detects the third wavelength(s) (240). In some embodiments, the system utilizes a camera and image recognition software to determine if an appropriate card is present, checking continuously or periodically.

The processor can then identify phosphor characteristics (250) based on the emitted wavelengths.

The phosphor characteristics may include a location (e.g., such as x,y coordinates, in pixels, mm, a pre-defined code for a particular region of the card, or any other means for specifying a location on the card as appropriate) on the card. For example, if the card contains phosphors arranged in a standardized matrix (e.g., including but not limited to a QR code), the positions of the phosphors can be determined based on the standardized arrangement. That is, if every card has a 5 mm×5 mm square of phosphors in the upper right corner of the card, the image processing techniques can detect the square, and based on its size and position, determine the x, y coordinates of any other detected phosphor or group of phosphors relative to the square.

The phosphor characteristic may include a rise and/or a decay time of the phosphors. In some cases, the rise time but not the decay time is used. In others, both are used. In still others, only the decay time, but not the rise time is used. By detecting the emissions over a brief period of time (typically less than 20 µs) during and after the excitation by the second wavelength(s), the processor can determine a rise time and a decay time.

Optionally, the processor may convert those characteristics into a code (260). For example, if the phosphors are provided in a 1D, 2D, or 3D barcode format, the processor can take a captured image of the phosphor emissions and read the barcode. In one embodiment, thicker and thinner strips of a single type of phosphor are deposited onto the card, creating a simply 1D barcode for the detector to detect and the processor to identify. In another embodiment, different phosphors may be used in different locations to provide additional information.

In some embodiments, the locations of the phosphors are determined based on distance from some origin point, such as a corner of the card, or some position detection pattern used on the card. For example, the system may identify a first phosphor at position x=10 (10 pixels to the right from the top left corner of the card) and y=20 (20 pixels from the top left corner of the card) and identify that has a decay time of 1 µs. The system may then not identify anything at x=20, y=20. The system may then identify a second phosphor at x=30, y=20, and identify that it has a decay time of 2 µs. The pattern of where phosphors are present (here, phosphor-no phosphor-phosphor) could translate to a 1D bar code, and the different phosphors could turn it into a 2D barcode, with the decay time or type of phosphor (if the type of phosphor is identified) being the second dimension. By placing phosphors in different x,y positions on the card, and using multiple types of phosphors, a 3D bar code could easily be created.

In one embodiment, seven or more different types of phosphors are used to encode information. Small rectangles/squares/cells, each containing one or more types of phosphor, can be deposited on the card in a grid or matrix format. As each type of phosphor can be uniquely identified based on its detectable characteristics (e.g., such as rise and/or decay time), With a 7-phosphor system, using only a single type of phosphor in each cell, each grid cell (containing one or more phosphors) would be capable of representing 8 different numbers (no phosphors="0", and each unique phosphor representing a number 1-7), or 3 bits of binary data. In some embodiments, the "blank" is not used, to ensure that a cell in which the phosphors had been rubbed off or otherwise removed cannot be confused with an intentionally blank cell. As more phosphors are allowed to be used in each "cell", the amount of data that each cell can represent increases dramatically. Where each cell can contain up to 3 types of phosphors, in a 7-phosphor system, each cell can represent up to 343 different numbers, or a little over 8 bits of data. Where each cell can contain up to 5 types of phosphors, each cell can represent up to 16,807 different numbers, or a little over 14 bits of data. If you limited the value of each cell to 14 bits of data, then it would take 19 cells to provide, e.g., a 256 bit value, such as a 256 bit hash value. Thus, in some embodiments, data, such as cryptographic hashes, can be imprinted on the card using the phosphors, and then read by a reader. That data can be used to, e.g., authenticate the card or user.

In one embodiment, the processor can convert a captured image of the phosphor emissions and detect a 1D, 2D, or 3D barcode based on the type of phosphor(s) utilized in particular locations.

Based on those characteristics, the processor can then determine if the card is authentic. This is typically done by comparing the characteristics (270) to either (a) calculated characteristics, or (b) pre-determined or pre-measured characteristics. For example, the cards may be scanned when they are manufactured, and the characteristics stored in a secure database. When the card is scanned, it can be compared to the secured characteristics to ensure they match. In other examples, the design or characteristics may be pre-determined. That is, a company may choose different designs to be present for each SKU, each brand name, or on some other rational basis. When the card is scanned, if it does not match the pre-determined design, it would not be considered authentic. In other examples, the phosphor characteristics to be deposited on the card are calculated, using some algorithm, preferably based on some measurable or detectable variable. When the card is scanned, one or more variables are determined (i.e., width, thickness, and thickness of card, card ID number, and card holder name, etc.), which are passed through the algorithm to determine what the expected phosphor pattern should be.

As an example, in one embodiment, after the system scans the card, the system extracts several pieces of information.

The system extracts the location, rise time, and/or decay time of at least some of the phosphors on the card. In some embodiments, only phosphors within one or more subsections of the card are considered. In some embodiments, the entire card is considered.

In some embodiments, another piece of information is from a visible light image of the card—a first number is extracted representing the visible identification number on the card (e.g., driver's license number, credit card number, SKU, VIN, etc.). This can be done using, e.g., known OCR techniques.

The system may then compare this extracted information internally. When handled internally, the card scanner may contain a database of information against which the location, rise time, and/or decay times extracted from the card can be compared. The card scanner may use the first number to request a remote server send the card scanner data that can be used for comparison. If the characteristics match, the card may be deemed authentic, and some visible signal can be sent to the user of the card scanner.

The system may alternative send this information to be compared remotely. In such cases, the extracted information is sent to, e.g., a remote server (70) which compares the received information with information previously stored on one or more secure databases (or on a private block chain, or via some other secure storage technique, etc.). The remote server ensures all characteristics of the received information match the characteristics stored in the database(s), and if so, the remote server may send the card scanner a signal indicating the card is authentic (e.g., "auth_flag=true").

In some embodiments, the card scanner or the remote server may also (or alternatively) send other information for the user of the card scanner. For example, if the passport is deemed "authentic", rather than sending a flag, the remote server may send an image or fingerprint data of the owner of the passport, an image of the product in question, etc., such that the user of the card scanner can utilize to continue verifying that the person providing the passport is not falsifying their identity.

In some embodiments, the pattern and/or particular phosphors in use on the card are based on the year the card was issue, the SKU, manufacturer, etc. For example, one manufacturer may have a particular logo that is imprinted in different locations, which may remain static, or the logo, locations, and/or phosphors used may change based on the year, product line, or some other factor.

In some embodiments, the characteristics are compared to calculated characteristics based on other information on the card. For example, the hash of a visible ID number can be a code representing what phosphors should be present in what locations. In one embodiment, a card uses a theoretical 16×16 grid for placing phosphors into. The SHA256 hash of a visible ID number can be broken up into multiple 4-character segments, each 4-character segment having a first character representing a row, a second character representing a column, and two characters representing one or more phosphors that should be present at that row/column combination. In this embodiment, the card would be manufactured after the phosphors would be deposited in the locations.

In some embodiments, when a second number is extracted representing the code determined based on the phosphor particles, other approaches can be utilized.

In some embodiments, the second number is used as a first level of authentication. In one example, the second number may simply be a duplicate of the first number, and the card might be authentic if the numbers match. In a second example, the second number may be a hash generated from the card's first number, and if the card reader hashes the first number and the result does not match the second number, the card would not be considered authentic. In a third example, where some authentication information may be stored on a remote server, etc., the second number may comprise a public key. That is, when the remote server attempts to authenticate information from the card scanner, if the second number does not allow the server to decrypt the information associated with that driver's license number or credit card number, the card may be classified as not authentic. If they match, the remainder of the comparison may continue.

In other embodiments, no detectors are present. Rather, the light emitting device emits a non-visible light onto the card, and the user sees visible light emitting from the card. In some embodiment, the light emitting device illuminates one side of the card, and the user sees visible light emitting from the other side of the card. In other embodiments, the light emitting device illuminates one side of the card, and the user sees visible light emitting from that same side. For example, in one embodiment, the user holds the card below the light emitting device, which illuminates the card with a non-visible light, and the user can see the light emitted by the phosphors coming from the same side of the card that was illuminated. In another example, the user holds the card above the light emitting device, then flips the card after it is illuminated and looks to see if the correct image or pattern is present. In some embodiments, the phosphors used in the card are selected so that they emit for a detectable period of time after illumination ends. In some of those embodiments, the card scanner emits a signal (audible or visible) after the illumination ends, and if the phosphors are not still visibly emitting when the signal is heard, the user will know the card is not authentic.

Those skilled in the art will recognize or be able to ascertain using no more than routine experimentation, many equivalents to the specific embodiments of the invention described herein. Such equivalents are intended to be encompassed by the following claims.

What is claimed is:

1. A system for authentication, comprising:
  a card comprising an infrared-blocking material capable of blocking a plurality of near infrared wavelengths, and at least one phosphor particle capable of absorbing at least one near-infrared wavelength; and
  a card reader comprising a light emitting device, a near-infrared detector, and a processor, the processor configured to:
    cause the card reader to emit a first wavelength of near infrared light to be received by the detector with a first signal strength;
    determine the presence of the card based on a comparison of the first signal strength and the signal strength of the received after a card has been inserted; and
    authenticate the card by:
      causing the card reader to emit at least one second wavelength;
      receiving at least one third wavelength at the detector, each of the at least one third wavelengths being emitted by the at least one phosphor particle; and
      identifying a location on the card of the at least one phosphor particle, and identifying a rise time of the at least one phosphor particle, a decay time of the at least one phosphor particle, or both.

2. The system according to claim 1, wherein authenticating the card further comprises comparing the identified characteristic to information stored on the card, in an external database, or a combination thereof.

3. The system according to claim 2, wherein the processor is configured to send the identified characteristic to a remote server, the remote server is configured to make a determination of authenticity based on the identified characteristic and send the results of that determination to the card reader.

4. The system according to claim 3, wherein the determination is made by comparing the identified characteristic to information stored in a private blockchain.

5. The system according to claim 1, wherein authenticating the card further comprises converting the at least one identified characteristic to at least one code.

6. The system according to claim 1, wherein the processor is further configured to receive a visible light image of at least one side of the card.

7. The system according to claim 1, wherein authenticating the card includes identifying a location on the card of the at least one phosphor particle, identifying a rise time of the at least one phosphor particle, and identifying a decay time of the at least one phosphor particle.

8. A method for authenticating identification cards, comprising:
  (a) emitting a first wavelength of near infrared light to be received by a detector with a first signal strength;
  (b) determining the presence of a card based on a comparison of the first signal strength and a second signal strength detected by the detector after the card has been inserted, the card comprising an infrared-blocking material capable of blocking a plurality of near infrared wavelengths and a phosphor particle capable of absorbing at least one near-infrared wavelength, wherein a card is considered present if the second signal strength is less than that of the first signal strength;

(c) emitting at least one second wavelength of near infrared light to be at least partially absorbed by the phosphor particle;

(d) receiving at least one third wavelength of near-infrared light at the detector, each of the at least one third wavelengths being emitted by the phosphor particle;

(e) identifying a location on the card of the phosphor particle, and identifying a rise time of the phosphor particle, a decay time of the phosphor particle, or both.

9. The method according to claim 8, further comprising comparing the detected phosphor particle characteristic to information stored on the card, in an external database, or a combination thereof.

10. The method according to claim 9, further comprising sending the detected information to a remote server, the; and receiving results of a determination of authenticity based on the detected particle characteristics from the remote server.

11. The method according to claim 10, wherein the determination is made by comparing the detected particle characteristics to information stored in a private blockchain.

12. The method according to claim 8, wherein authenticating the card further comprises converting the at least one detected phosphor particle characteristic to at least one code.

13. The method according to claim 8, further comprising capturing an image of at least one side of the card.

14. The method according to claim 13, further comprising detecting characters present in the captured image of at least one side of the card.

15. The method according to claim 8, wherein the at least one second wavelength includes a plurality of wavelengths, and the at least one third wavelength includes an additional plurality of wavelengths.

16. A method for authenticating identification cards, comprising:

(a) emitting at least one wavelength of light to be at least partially absorbed by a plurality of phosphor particles arranged in a pattern on a card;

(b) visually detecting a pattern of the plurality of phosphor particles on the card based on at least one additional wavelength of light emitted from the plurality of phosphor particles after or during the emission of the at least one wavelength of light;

(c) receiving the at least one additional wavelength of light at a detector; and (d) identifying a location on the card of the plurality of phosphor particles, and identifying a rise time of the plurality of phosphor particles, a decay time of the plurality of phosphor particles, or both.

* * * * *

UNITED STATES PATENT AND TRADEMARK OFFICE
CERTIFICATE OF CORRECTION

PATENT NO. : 11,922,265 B2  
APPLICATION NO. : 17/620858  
DATED : March 5, 2024  
INVENTOR(S) : Joshua E. Collins et al.

Page 1 of 1

It is certified that error appears in the above-identified patent and that said Letters Patent is hereby corrected as shown below:

On the Title Page

Item (72), replace the following:
"Joahua E. Collins"
With:
--"Joshua E. Collins"--

In the Claims

In Column 11, Lines 23-26, replace the following:
"The method according to claim 9, further comprising sending the detected information to a remote server, the; and receiving results of a determination of authenticity based on the detected particle characteristics from the remote server."
With:
--The method according to claim 9, further comprising sending the detected information to a remote server, and receiving results of a determination of authenticity based on the detected particle characteristics from the remote server.--

Signed and Sealed this  
Fifth Day of November, 2024

Katherine Kelly Vidal  
*Director of the United States Patent and Trademark Office*